United States Patent
Jeong

[11] Patent Number: 5,978,341
[45] Date of Patent: Nov. 2, 1999

[54] DISK PLAYER

[75] Inventor: Tae-hwan Jeong, Suwon, Rep. of Korea

[73] Assignee: Samsung Electronics Co., Ltd., Rep. of Korea

[21] Appl. No.: 08/987,979

[22] Filed: Dec. 10, 1997

[30] Foreign Application Priority Data

Dec. 10, 1996 [KR] Rep. of Korea ........................ 96-64019

[51] Int. Cl.[6] ............................ G11B 17/04; G11B 17/03
[52] U.S. Cl. ........................................ 369/75.2; 369/77.1
[58] Field of Search ................................ 369/75.1, 75.2, 369/77.1, 77.2; 360/99.06, 99.07, 99.12

[56] References Cited

U.S. PATENT DOCUMENTS

| | | | |
|---|---|---|---|
| 5,181,197 | 1/1993 | Sugie et al. | 369/75.1 |
| 5,805,554 | 9/1998 | Suzuki et al. | 369/77.1 |
| 5,812,511 | 9/1998 | Kawamura et al. | 369/77.2 |

FOREIGN PATENT DOCUMENTS

| | | | |
|---|---|---|---|
| 61-94262 | 5/1986 | Japan | 369/75.1 |
| 7-161112 | 6/1995 | Japan . | |
| 8-96565 | 4/1996 | Japan . | |
| 8-273265 | 10/1996 | Japan . | |

*Primary Examiner*—David L. Ometz
*Attorney, Agent, or Firm*—Dilworth & Barrese

[57] ABSTRACT

In a disk player, a turntable is fixedly installed inside a housing to rotate a disk placed thereon. A disk tray is installed to be capable of moving in and out of the housing to convey the disk toward and away from the turntable. A disk supporter is installed at the disk tray to be capable of moving up and down for supporting the disk. An elastic supporting unit supports the disk supporter by elastically biasing the disk supporter upward with respect to the disk tray. A pivot member pressing the upper surface of the disk is placed on the turntable and concurrently lowers the disk supporter.

17 Claims, 7 Drawing Sheets

DISK PLAYER

BACKGROUND OF THE INVENTION

1. Field of the Invention

The present invention relates to a disk player, and more particularly, to a disk player having an improved disk loading mechanism for placing a disk on a turntable.

2. Description of the Related Art

A conventional disk player for recording/reproducing information using a recording medium such as a magnetic disk, an optical disk or a magnetooptical disk includes, as shown in FIG. 1, a housing 10 and a deck 20 installed in the housing 10 to be capable of pivoting around a hinge 21. A turntable 23 on which a disk 5 is to be placed is coupled with the deck 20 and the turntable 23 is rotated by a spindle motor 25. A disk tray 30 for conveying the disk 5 into and out of the housing 10 is installed in the housing 10.

As shown in FIG. 2, in the conventional disk player described as above, when the disk tray 30 on which the disk 5 is placed is inserted into the housing 10, the deck 20 located at an angle pivots upward and thus the disk 5 is securely placed on the turntable 23. Here, since the deck 20 pivots around the hinge 21, the size of the housing 10 is required to take up enough space to allow pivoting of the deck therein. Also, there is a possibility that the disk 5 may not be precisely placed on the turntable 23. Further, since the structure of the above pivoting mechanism is complicated, the assembly thereof is difficult.

SUMMARY OF THE INVENTION

To solve the above problems, it is an objective of the present invention to provide a disk player having a simplified structure and in which a disk can be precisely placed on a turntable.

Accordingly, to achieve the above objective, there is provided a disk player which comprises a turntable fixedly installed inside a housing to rotate a disk placed thereon, a disk tray installed to be capable of moving in and out of the housing to convey the disk toward and away from the turntable, a disk supporter installed at the disk tray to be capable of moving up and down for supporting the disk, an elastic supporting unit for supporting the disk supporter by elastically biasing the same upward with respect to the disk tray, and a pivot member pressing the upper surface of the disk placed on the turntable and concurrently lowering the disk supporter.

Preferably, the elastic supporting unit comprises a pivot bar installed at the disk tray to be capable of pivoting and having a center shaft portion acting as the axis of rotation and a pivot shaft portion which extends outwardly from the center shaft portion and supports the disk supporter, and an elastic member providing an elastic force to the pivot bar to keep the disk supporter lifted.

Also, preferably, the elastic supporting unit further comprises an eccentric member which is fixed to the pivot bar so that, when the pivot member presses the disk, the eccentric member is pressed by a protrusion formed on the pivot member and the pivot bar pivots downward thereby lowering the disk supporter.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 1:
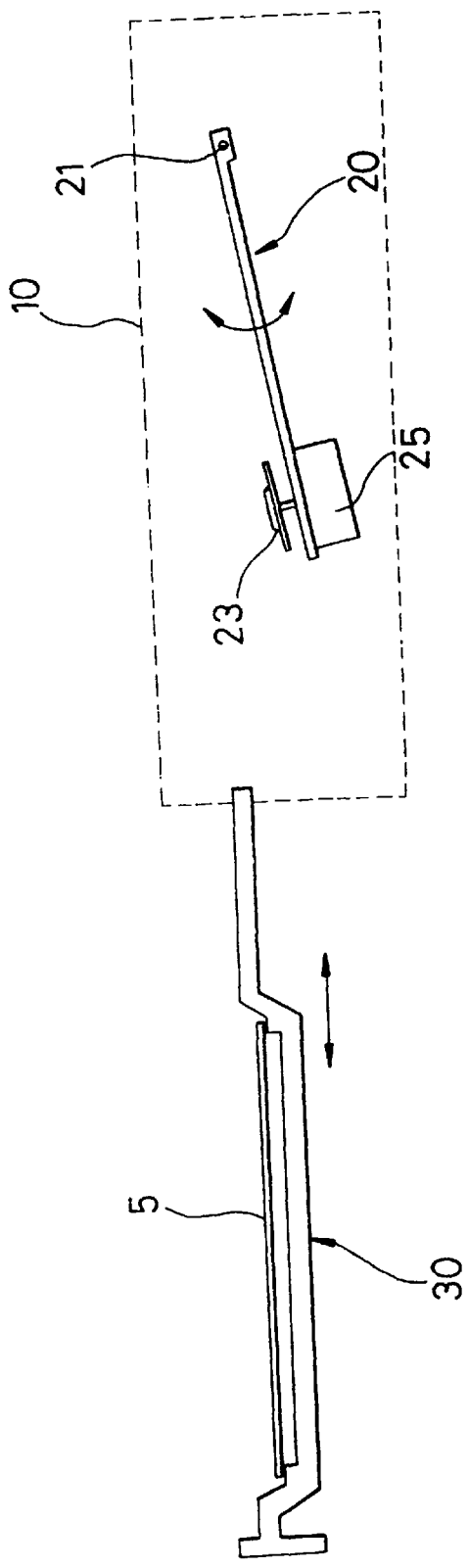
FIG. 1 is a sectional view illustrating a conventional disk player in which a disk tray is ejected out of a housing.
Figure 2:
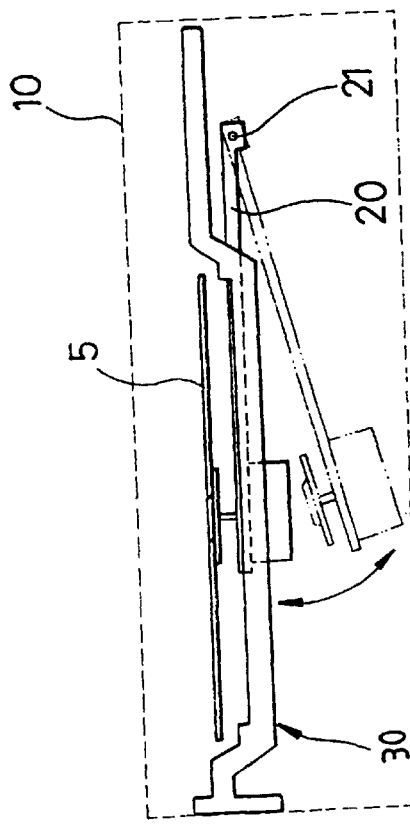
FIG. 2 is a sectional view illustrating the conventional disk player shown in FIG. 1 in which the disk tray is inserted in the housing.
Figure 3:
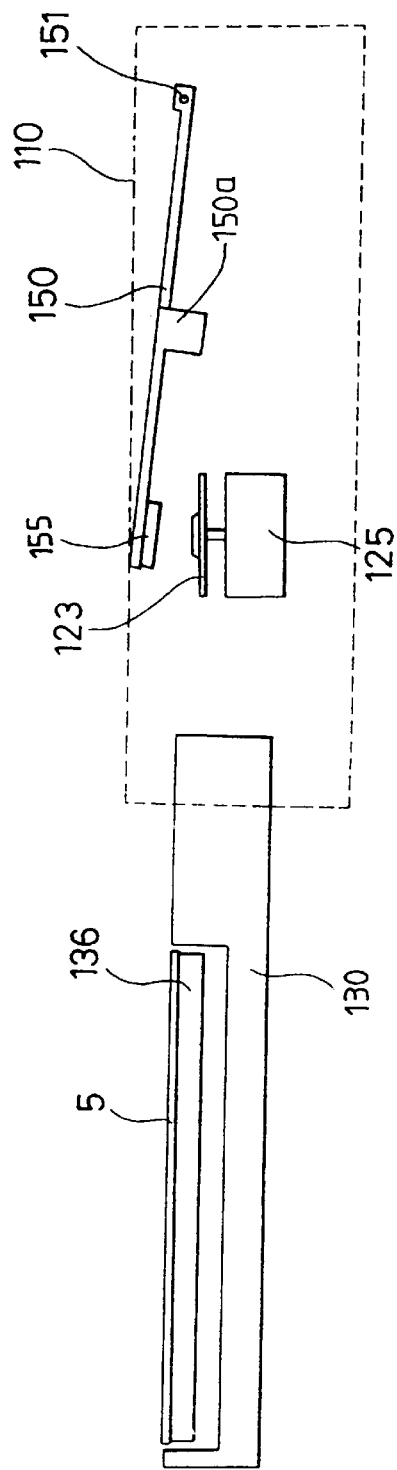
FIG. 3 is a sectional view illustrating a disk player according to the present invention in which a disk tray is ejected out of a housing.
Figure 4:
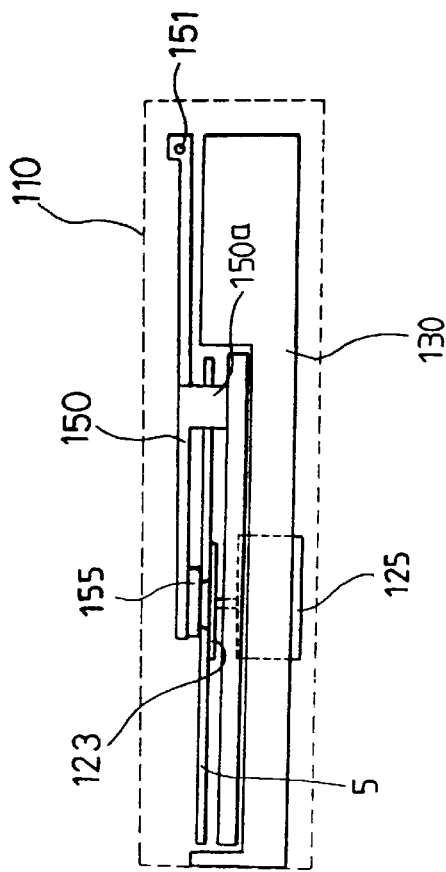
FIG. 4 is a sectional view illustrating the disk player shown in FIG. 3 in which the disk tray is inserted in the housing.

Referring to FIGS. 3 and 4, in a disk player according to the present invention, a spindle motor 125 is installed in a housing 110. A turntable 123 on which a disk 5 is placed is coupled to the spindle motor 125. A disk tray 130 for conveying the disk 5 is installed at the housing 110 to be capable of moving in and out of the housing 110 through an opening (not shown) formed at one side of the housing 110. Also, a pivot member 150 for pushing the disk 5 conveyed by the disk tray 130 against the turntable 123 is installed in the housing 123 to be capable of pivoting.

The pivot member 150 which is coupled to the housing 110 to be capable of pivoting around a hinge shaft 151 includes a pressing member 155 which presses the upper surface of the disk 5 moved into the housing 110 against the turntable 123, and a protrusion 150a. The pressing member 155 rotates together with the disk 5 while pressing the disk 5.

A disk supporter 136 for supporting the disk 5 is installed at the disk tray 130 to be capable of moving up and down with respect to the disk tray 130. The disk supporter 136 is supported by an elastic supporting unit (not shown in FIGS. 3 and 4) which supports the disk supporter 136 to move up and down and simultaneously elastically biases the disk supporter 136 upward.

Figure 5:
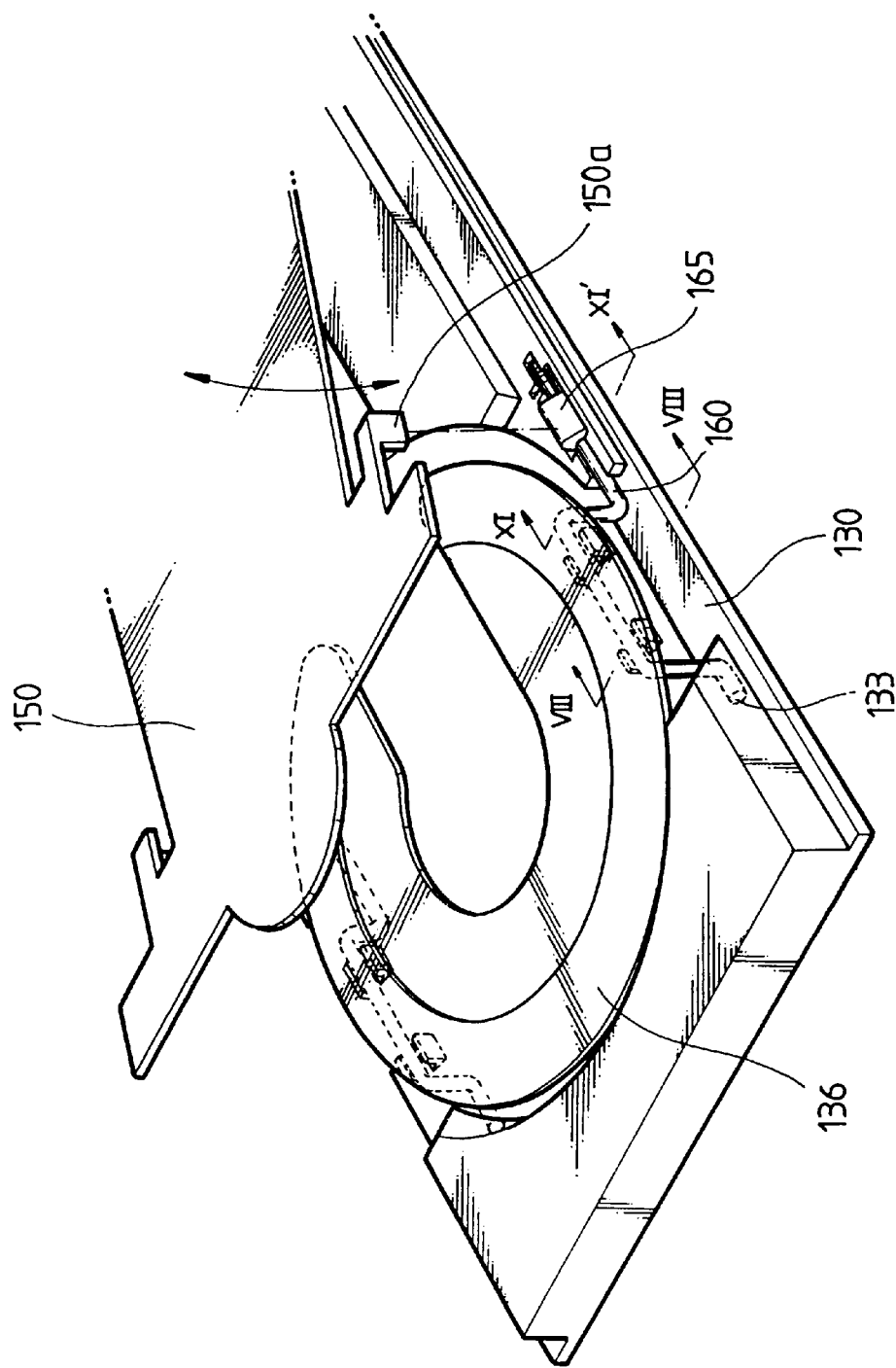
FIG. 5 is a perspective view illustrating the disk tray and the pivot member shown in FIG. 3.
Figure 6:
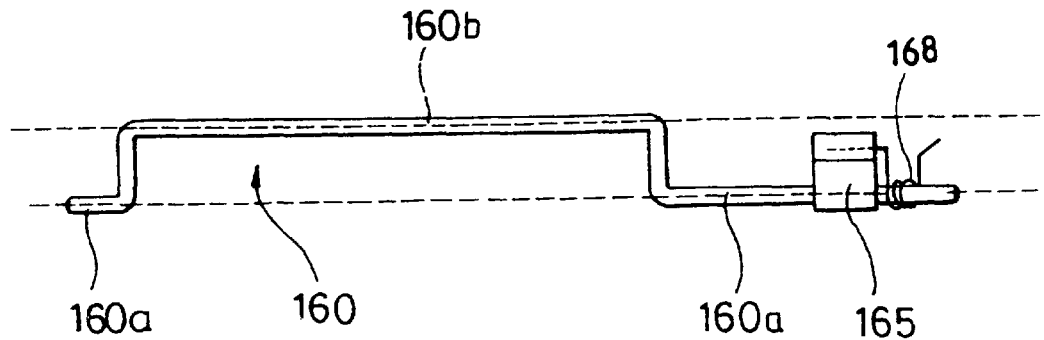
FIG. 6 is a front view illustrating the pivot bar and the eccentric member shown in FIG. 5.

Referring to FIG. 5, the elastic supporting unit includes a pivot bar 160 for supporting the disk supporter 136, an eccentric member 165 combined with the pivot bar 160, and an elastic member such as a torsion spring 168. The pivot bar 160 is, as shown in FIG. 6, comprised of a center shaft portion 160a which acts as the axis of rotation and a pivot shaft portion 160b which extends outwardly from the center shaft portion 160a. Preferably, the elastic supporting unit is provided at both sides of the disk supporter 136.

Figure 8:
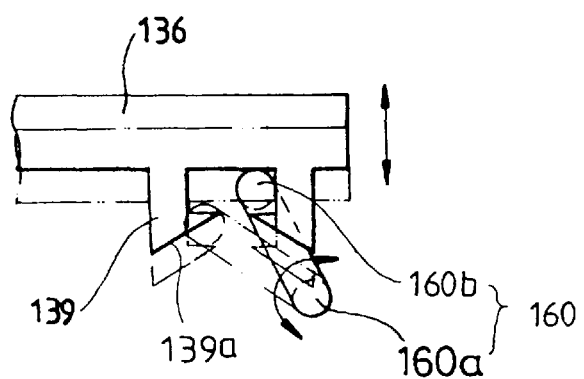
FIG. 8 is a sectional view taken along line VIII–VIII' of FIG. 5.
Figure 9:
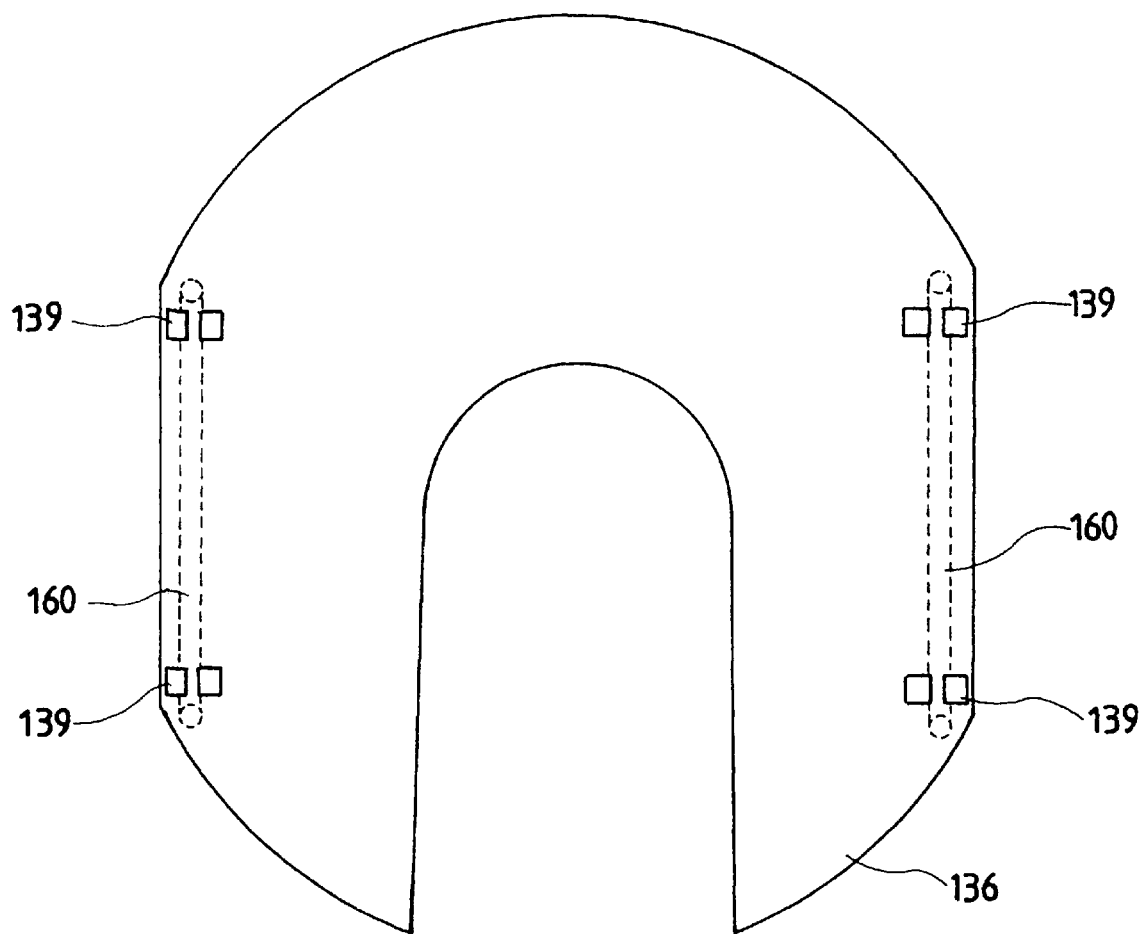
FIG. 9 is a bottom view illustrating the disk supporter shown in FIG. 5.

As shown in FIGS. 5 and 9, a plurality of protruding hooks 139 which can be elastically deformed are formed at the lower surface of the disk supporter 136, and the pivot shaft portion 160b of the pivot bar 160 is inserted between the protruding hooks 139, thereby being coupled thereto. Referring to FIG. 8, an angled surface 139a is formed at the protruding hook 139 to facilitate coupling with the pivot bar 160. Thus, the pivot bar 160 can be inserted in the protruding hook 139 by pressing the pivoting bar 160 along the angled surface 139a. Also, there is a space between the protruding hooks 139 to allow a predetermined degree of movement of the pivot bar 160 which is coupled to the protruding hooks 139. Accordingly, the disk supporter 136 moves up and down as the pivot shaft portion 160b rotates, as shown in FIG. 8.

Figure 10:
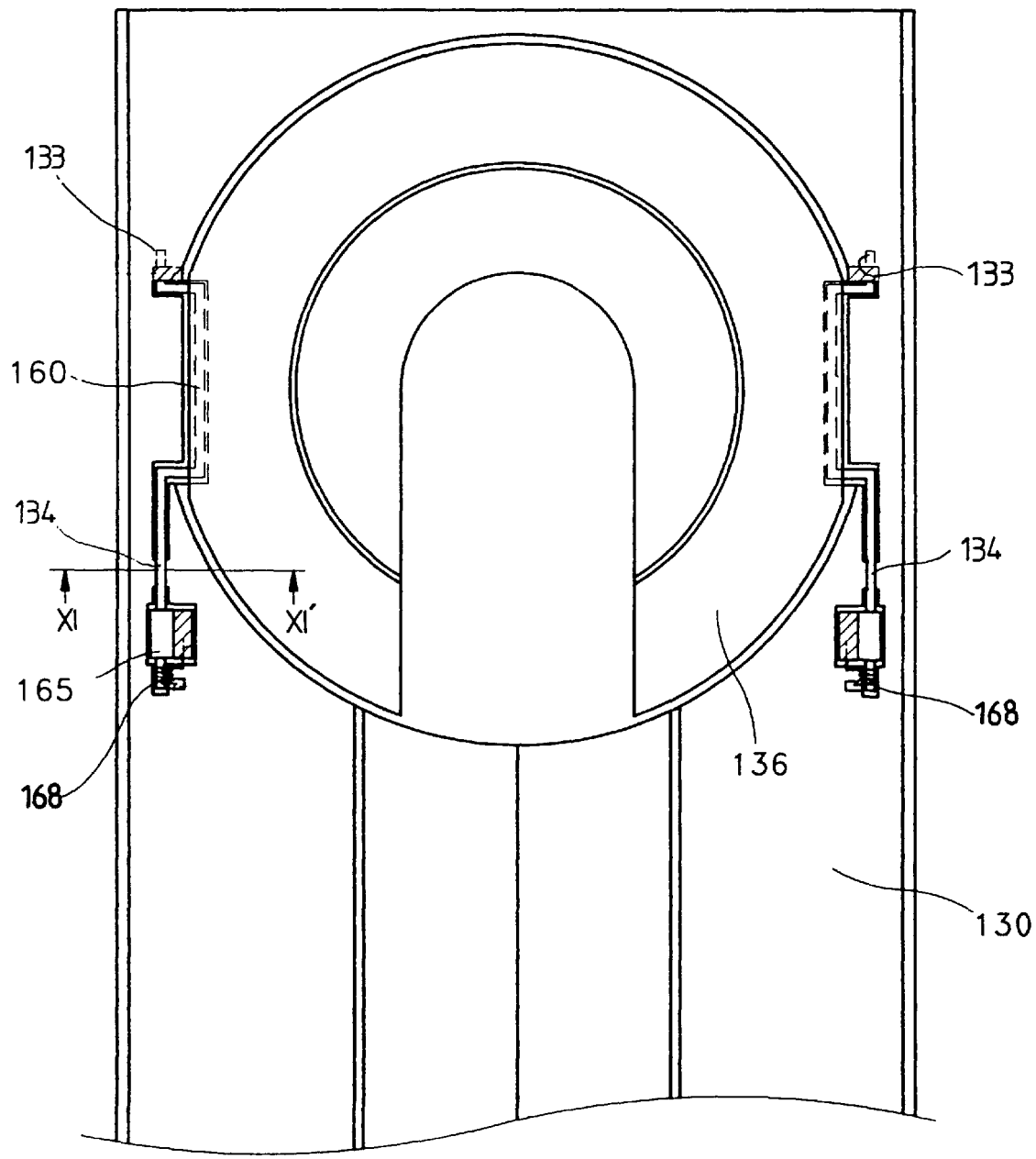
FIG. 10 is a plan view of the disk tray shown in FIG. 5.
Figure 11:
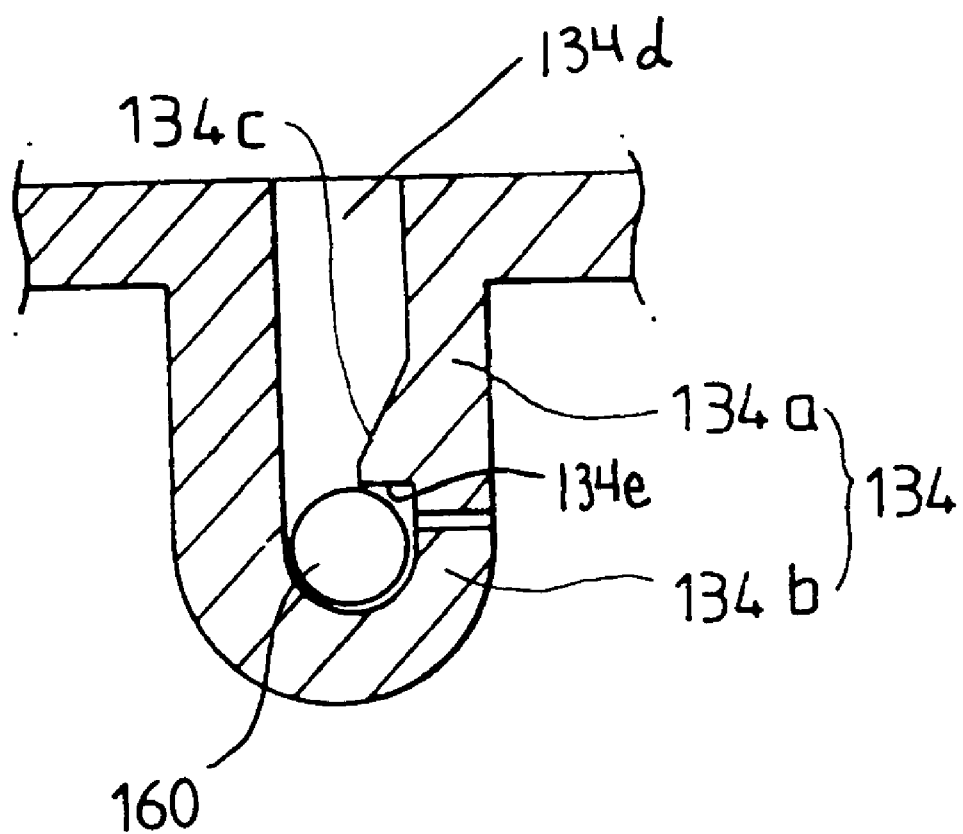
FIG. 11 is a sectional view taken along line XI–XI' of FIG. 10.

Referring to FIGS. 5 and 10, one end of the pivot bar 160 is coupled to an insertion hole 133 formed in the disk tray 130 and the other end thereof is coupled to a hook coupling portion 134 of the disk tray 130. The hook coupling portion 134 includes a recess 134d having a hook or retaining member 134a and a support member 134b as shown in FIG. 11. The hook member 134a can be elastically deformed and has an angled surface 134c to facilitate coupling of the pivot bar 160 and a substantially perpendicular retaining surface 134e. Thus, by pressing the pivot bar 160 from above the hook coupling portion 134 along the angled surface 134c, the hook member 134a is elastically deformed and thereby the pivot bar 160 is inserted in the hook coupling portion 134.

Figure 7:
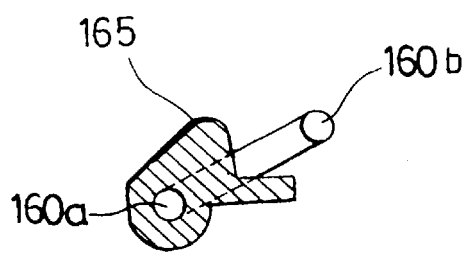
FIG. 7 is a side view illustrating the pivot bar and the eccentric member shown in FIG. 6.

As shown in FIGS. 5, 6 and 7, the eccentric member 165 is fixed to the other end of the pivot bar 160. The eccentric member 165 is located under the protrusion 150a of the pivot member 150 (see FIG. 5) to thereby be pressed by the protrusion. Also, the eccentric member 165 is elastically biased by the torsion spring 168 having an end coupled to the eccentric member 165 and the other end coupled to the disk tray 130. Thus, the pivot bar 160 coupled to the eccentric member 165 is elastically biased so that the disk supporter 136 is biased upward.

The operation of the disk player having the above structure according to the present invention will now be described.

As shown in FIG. 3, in a state in which the disk tray 130 is ejected out of the housing 110, the disk 5 is placed on the disk supporter 136. Here, the disk supporter 136 is kept above the disk tray 130 by the bias of the pivot bar 160 (see FIG. 5). Also, the pivot member 150 in the housing 110 is rotated upward around the hinge 151, thus being disposed at an angle.

Next, when the disk tray 130 is inserted into the housing 110, the pivot member 150 pivots by an actuator (not shown) so that the pressing member 155 presses against the upper surface of the disk 5. Accordingly, the disk 5 closely contacts the turntable 123. Concurrently, since the protrusion 150a (see FIG. 5) presses the upper surface of the eccentric member 165, the disk supporter 136 is pulled down as the pivot bar 160 pivots. As the disk supporter 136 descends, the disk 5 is placed on the turntable 123 and the disk supporter 136 is separated from the disk 5. When the disk 5 is placed on the turntable 123, the disk 5 rotates by being driven by the spindle motor 125.

Assembly of the disk player according to the present invention described above is easy because the pivot bar is simply coupled to the insertion hole of the disk tray and the protruding hook formed on the disk supporter. Also, since the pivot member pivots, a space for pivoting the same can be smaller than that of the conventional mechanism in which the deck itself pivots. Further, since the turntable is fixed and does not pivot, positional errors during loading of a disk can be reduced.

What is claimed is:

1. A disk player comprising:

a turntable fixedly installed inside a housing to rotate a disk placed thereon;

a disk tray installed to move in and out of said housing to convey the disk toward and away from said turntable;

a disk supporter supported on at said disk tray, the disk supporter being movable from a raised position to a lowered position;

an elastic supporting unit for supporting said disk supporter and elastically biasing the disk supporter to the raised position; and a pivot member including a pressing member and a protrusion, the pressing member being positioned to press the upper surface of the disk against said turntable and the protrusion being positioned to concurrently move said disk supporter to the lowered position.

2. The disk player as claimed in claim 1, wherein said elastic supporting unit comprises:

a pivot bar pivotably supported on said disk tray and having a center shaft portion acting as the axis of rotation and a pivot shaft portion which extends outwardly from said center shaft portion and supports said disk supporter; and an elastic member providing an elastic force to said pivot bar to urge said disk supporter upwardly.

3. The disk player as claimed in claim 2, wherein said elastic supporting unit further comprises an eccentric member which is fixed to said pivot bar so that, when said pivot member presses said disk, said eccentric member is pressed by said protrusion formed on said pivot member to pivot said pivot bar downward thereby lowering said disk supporter.

4. The disk player as claimed in claim 2, wherein one said elastic supporting unit is provided at both sides of said disk supporter.

5. The disk player as claimed in claim 2, wherein protruding hooks between which said pivot shaft portion of said pivot bar is inserted are formed on a lower surface of said disk supporter.

6. The disk player as claimed in claim 5, wherein at least one of said protruding hooks has an angled surface to facilitate coupling with said pivot shaft portion of said pivot bar.

7. The disk player as claimed in claim 2, wherein an insertion hole in which one end of said pivot bar is inserted and a hook coupling portion to which the other end thereof is coupled are formed on said disk tray.

8. The disk player as claimed in claim 7, wherein said hook coupling portion comprises:

a hook member which is elastically deformed to be coupled with said pivot bar; and a supporting member for supporting said coupled pivot bar.

9. A disk player comprising:

a housing;

a disk tray having a top surface and including a disk supporter movable between a raised and a lowered position relative to the top surface of the disk tray, the disk tray being movable into and out of the housing;

a supporting unit operatively associated with the disk supporter, the supporting unit being positioned to urge the disk supporter to the raised position; and a pivot member supported within the housing, the pivot member being movable to press a disk onto a turntable and to concurrently contact the disk supporter to move the disk supporter to the lowered position, wherein in the lowered position, the disk supporter is spaced from the disk on the turntable.

10. The disk player as claimed in claim 9, wherein the supporting unit includes a pivotable bar having a center shaft portion and a pivot shaft portion, the pivot shaft portion extending outwardly from the center shaft portion and being positioned to engage the disk supporter.

11. The disk player as claimed in claim 10, wherein the supporting unit further includes an eccentric member secured to the center shaft portion of the pivotable bar, the pivot member being movable into engagement with the eccentric member to pivot the pivotable bar and move the disk supporter to the lowered position.

12. A disk player as claimed in claim 11, wherein the disk player includes two said supporting units, one said supporting unit being positioned adjacent one side of the disk supporter and another said supporting unit being positioned adjacent an opposite side of the disk supporter.

13. A disk player as recited in claim 10, wherein a pair of protruding hooks are provided on a lower surface of the disk supporter, the protruding hooks being configured to receive the pivot shaft portion of the pivotable bar.

14. A disk player as recited in claim 13, wherein at least one of the protruding hooks includes an angled surface to facilitate reception of the pivot shaft portion of the pivotable bar.

15. A disk player as recited in claim 10, wherein the disk tray further includes an insertion hole and a coupling member, one end of the pivotable bar being positioned within the insertion hole and the other end of the pivotable bar being connected to the coupling member.

16. A disk player as recited in claim 15, wherein the coupling member includes a recess having a deformable retaining member positioned therein, wherein insertion of the other end of the pivotable bar into the recess causes the retaining member to deform to allow passage of the pivotable bar.

17. A disk player as recited in claim 16, wherein the retaining member includes an angled top surface and a flat retaining surface, the flat retaining surface extending substantially perpendicularly inwardly from a recess wall.

* * * * *